Feb. 25, 1936.　　　　J. R. KIEL　　　　2,031,608
TALKING MOTION PICTURE APPARATUS
Original Filed May 8, 1930　　　3 Sheets-Sheet 1

Inventor:
John Ripley Kiel,
By Banning & Banning
Attys.

Feb. 25, 1936.   J. R. KIEL   2,031,608
TALKING MOTION PICTURE APPARATUS
Original Filed May 8, 1930   3 Sheets-Sheet 2
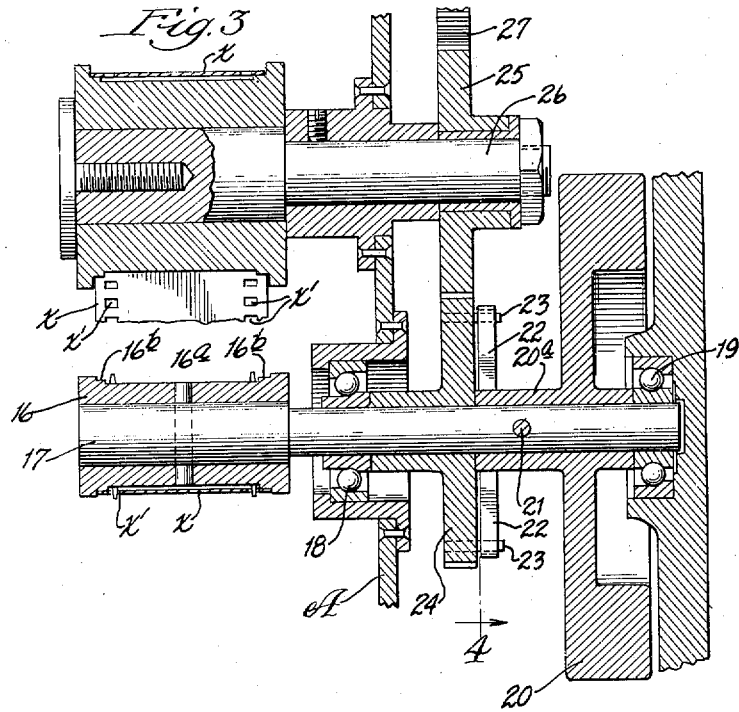
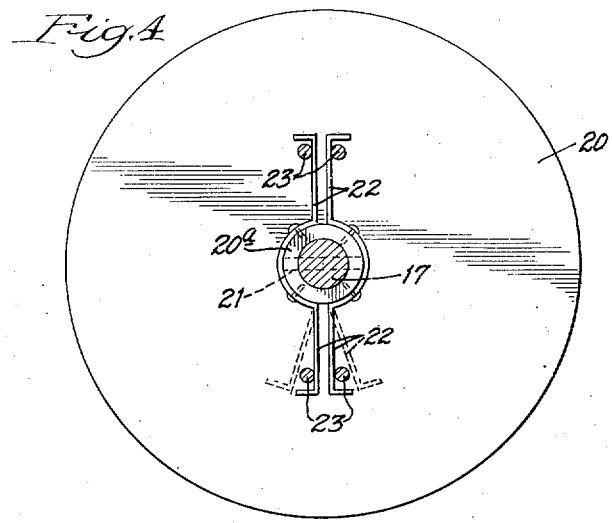
Inventor:
John Ripley Kiel,
By Banning & Banning
Attys.

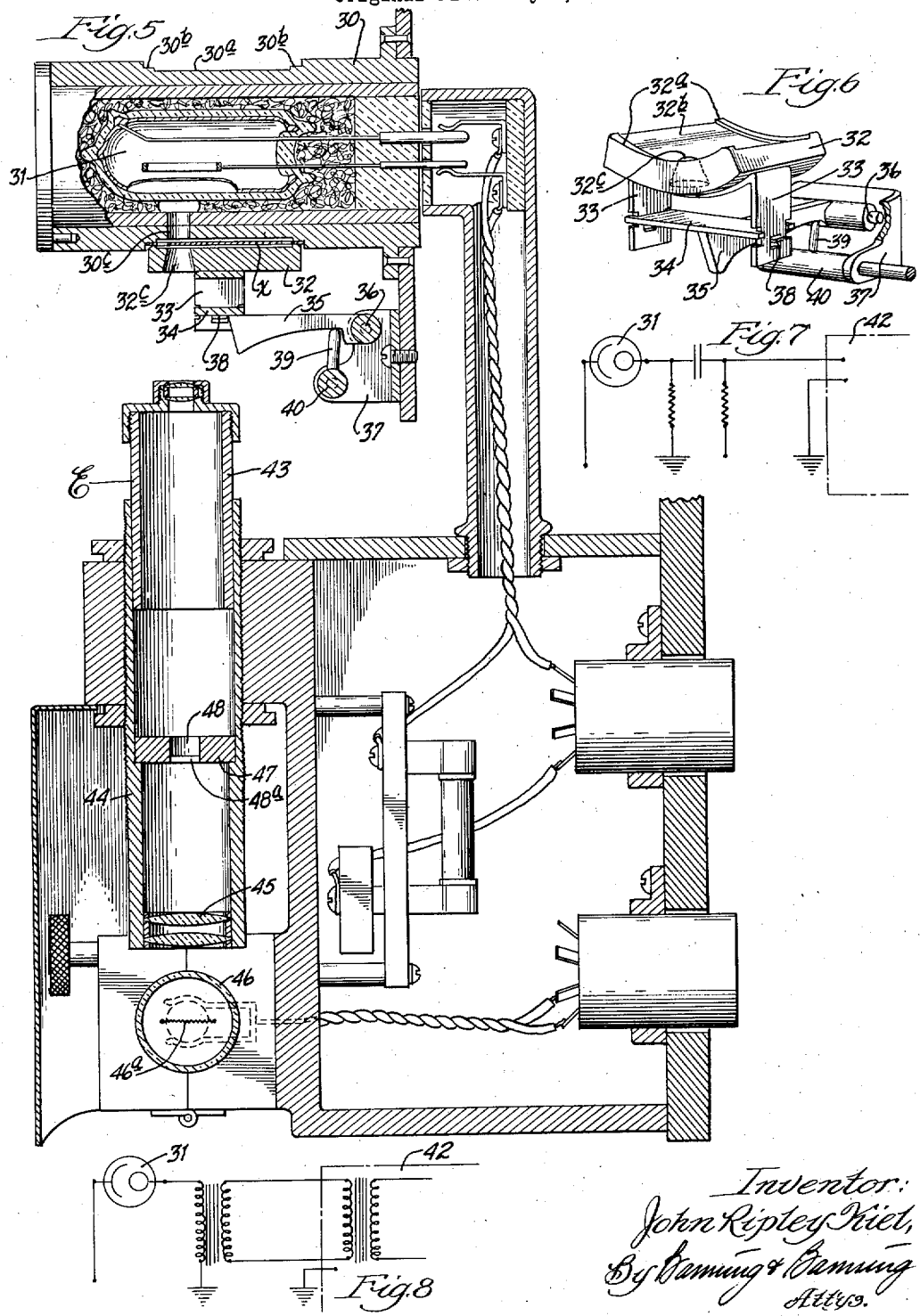

Patented Feb. 25, 1936

2,031,608

UNITED STATES PATENT OFFICE 2,031,608

TALKING MOTION PICTURE APPARATUS

John Ripley Kiel, Chicago, Ill., assignor to Auditone Company, Chicago, Ill., a corporation of Illinois Application May 8, 1930, Serial No. 450,634
Renewed May 28, 1935

7 Claims. (Cl. 88—16.2)

An object of this invention is to provide in speaking motion picture apparatus, particularly of the portable type, means for deadening and suppressing objectionable noises in the projector.

Another object is to provide means for smoothing the action of the film as it passes through speaking motion picture apparatus, particularly of the type in which the sound record is a light record on the film. Thus, by smoothing the action of the film, especially just previous to and during its passing through the light-sound reproducing mechanism, the sound produced thereby is much more smooth and natural.

Another object is to provide a yieldable drive mechanism for the film in sound motion picture mechanism which further smooths out the operation of the film, particularly where this device is close to the light-sound reproducing mechanism, whereby a more perfect reproduction of the sound is obtained from the film.

Another object is to provide an improved light pick-up mechanism which permits of an easy insertion and removal of the film, as well as easy access to the same for inspection and cleaning.

Still another object is to provide an improved lamp for use in a light-sound pick-up whereby sagging of the filament of the lamp will not materially affect the amount of light therefrom which falls on the light strip of the film.

These and other objects, as will hereinafter appear, are accomplished by the present invention which is fully described in the following specification, and shown in the accompanying drawings, in which—

Fig. 3 is a partial enlarged section on the line 3—3 of Fig. 1 showing the details of the yieldable drive mechanism;

Fig. 4 is an enlarged section on the line 4 of Fig. 3;

Fig. 5 is an enlarged vertical section on the line 5—5 of Fig. 1;

Fig. 6 is a partial perspective view showing the drop-out mechanism of the upper portion of Fig. 3;

Fig. 7 is a wiring diagram showing the light-sound amplifier; and

Fig. 8 is a wiring diagram showing a modified form of light-sound amplifier.

Figure 1:
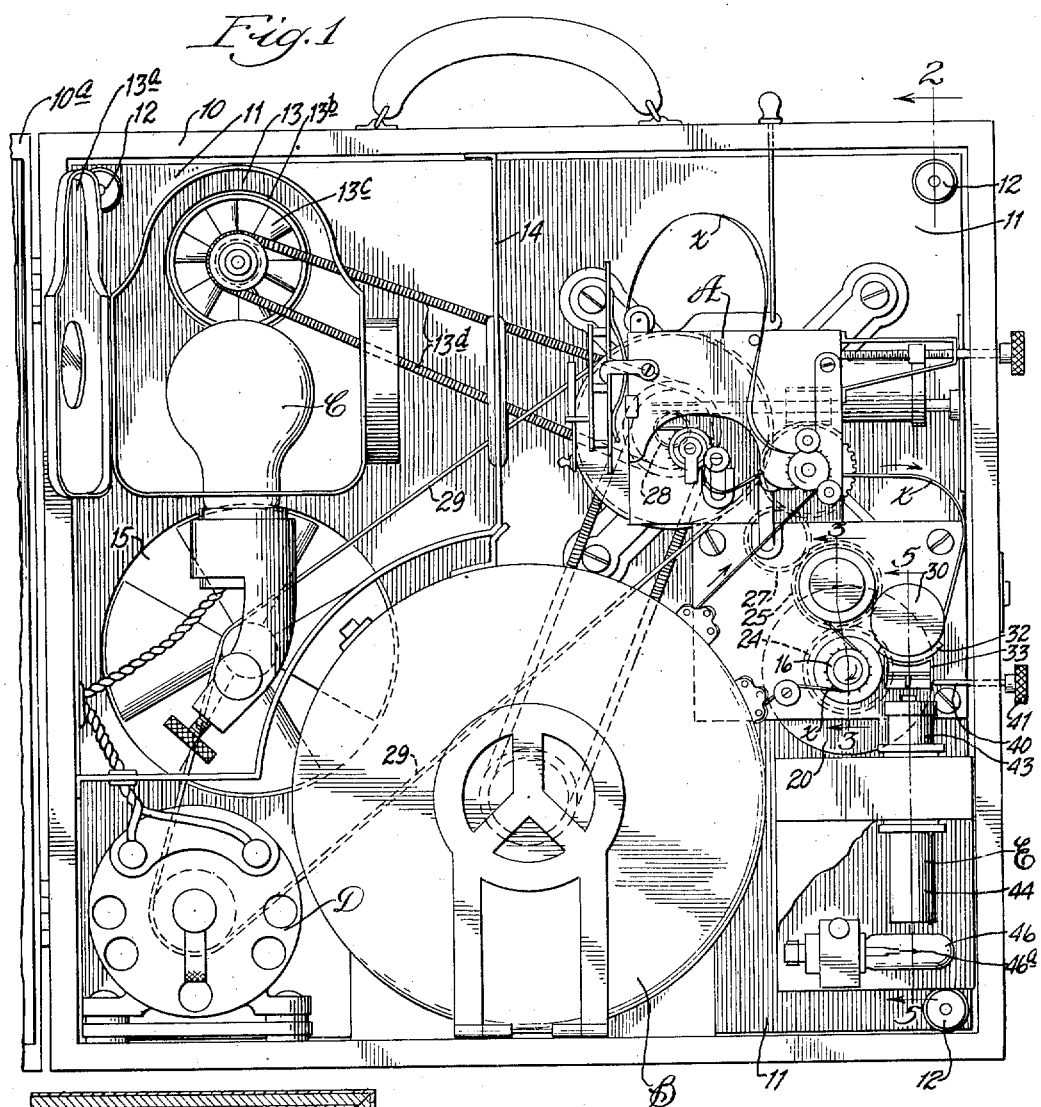
Figure 1 is a side elevation of a portable motion picture projector and sound pick-up embodying the present invention.
Figure 2:
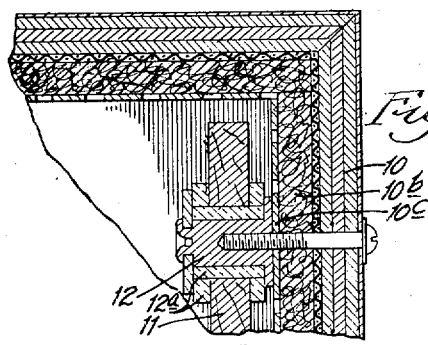
Fig. 2 is an enlarged section on the line 2 of Fig. 1 showing the sound proofing.

The embodiment illustrated in Fig. 1 shows a portable motion picture projector comprising a case 10 having a door 10$^a$ hingedly mounted thereon, and adapted to swing so as to close the mechanism shown. The case, as shown in section in Fig. 2, is made up of laminated wood, or the like, having a cloth cover and may be lined inside, if desired, with an acoustical material 10$^b$ and sheet metal 10$^c$. Within the case is a mounting panel 11 of wood, or a suitable acoustical material, which is secured to the back of case 10 by means of a suitable mounting 12, the mounting being separated from the panel 11 by rubber washers, or the like, 12$^a$.

Thus it will be seen that the panel 11 is separated from the case 10, and is supported therein at four or more points by means of the mountings 12. This panel carries substantially all of the projector and sound reproducing mechanism so that it acts as a deadener for the sound produced by the mechanism within the case, thereby greatly reducing the noise of the same which will reach the ears of the audience which, where this form of mechanism is used, is generally in the same room and often quite close to the projector. Where sound pictures are produced under these circumstances this noise is very objectionable.

Referring now to Fig. 1, the apparatus comprises the motion picture projector proper A, the housings B lying one behind the other for the two reels from which and to which film is fed to and from the projector A, the projector lamp C which furnishes the necessary light for the projector, an electric motor D, for driving the entire mechanism shown, and a light-sound pick-up mechanism E. All of these with the exception of the motor D and the housing B are carried on the mounting panel 11.

The projector lamp C is located in a housing 13 which is normally closed by means of a cover 13$^a$, but has a series of holes (not shown) in the bottom of the housing for the passage of air around the lamp. Registering openings 13$^b$ in the side of the case and of the housing are arranged to take a fan 13$^c$ which is driven by means of a belt 13$^d$, passing over a pulley which in turn is driven from the motor D, as will later be described. A partition 14 encloses the housing 13, and a fan 15 driven also by a belt from the motor D forces air into the case and up through the holes in the bottom of the housing 13, thereby cooling the lamp C after which it is forced out by the fan 13$^c$.

Except as herein noted, the projector mechanism is old, and hence is not discussed in detail because it is so well known.

Referring now to Figs. 3 and 4, a film drive sprocket 16 is pinned to a shaft 17 which is suitably mounted in the frame of the projector A by means of ball bearings 18 and 19. The shaft 17 carries a fly wheel 20 which is secured thereto by means of a pin 21, the fly wheel having a hub 20a (Fig. 4), to which is secured springs 22 which extend laterally therefrom in pairs, and which lie between and firmly engage pins 23 and a gear 24 which is journaled on the shaft 17. The springs 22 normally spread farther apart, as shown in dotted lines in Fig. 4, and are brought nearly together before they are inserted between the pins 23 so as to place them under an initial stress.

The spur gear 24 meshes with a spur gear 25 which is journaled upon the stud axle 26, and is driven by a gear 27 which in turn is driven through a suitable chain of gears from the main drive shaft 28 (Fig. 1) of the projector A, which in turn is driven by means of a belt 29 from the motor D.

Thus it will be seen that as the gear 24 (Fig. 3) is driven through this long train of gears considerable inequalities and unevennesses of motion are bound to occur which would usually be transmitted to the film drive sprocket 16 if the gear 24 were directly connected to the shaft 17. By using the yieldable drive member 22, however, these little irregularities or jolts which are only momentary in their action merely cause the springs 22 to yield for an instant, and then to return to substantially their normal position because of the fly wheel which tends to keep the shaft 20 running at substantially a uniform speed.

It is important that the film sprocket 16 runs at a very uniform rate because of the fact that the film X is being drawn down and around the lower surface of the sleeve 30, in which is located a light sensitive tube 31 (Fig. 5). As it does so, light is passed through the light strip of the film, as will later be described in detail, and the light thus passing through the film is transformed into electrical pulsations of varying intensity by means of the light sensitive tube or photo-electric 31 in a well manner, and these pulsations are then amplified through a suitable loud speaker (not shown).

From the foregoing, however, it will be seen that it is a prime essential that the film X be carried around the sleeve 30 at a uniform speed, otherwise the sound reproduced therefrom will be jerky to the same extent as the motion of the film X is irregular. This steadiness and uniformity of motion of the sprocket 16 is insured to a very great extent by the flexible drive described above, and shown in Figs. 3 and 4.

Another invention relates to the film track itself. It will also be observed in Fig. 3 that the film X does not touch the bottom of the film groove 16a, but that it only touches the annular shoulders 16b, and that at a point entirely outside the line of perforations X' of the film X, this groove being relieved through the center 16a so as not to touch the film X at all.

Referring now to Fig. 5, it will be seen that the bottom of the annular groove 30a is relieved in the same way as the portion 16a of Fig. 3, and likewise there are two lateral shoulders 30b which receive and support the film which at the same time is guided by the vertical sides of these shoulders. This is of great importance where the film X passes the narrow slot 30c where light, as will later be explained, passes through the film and up to the light sensitive tube 31.

It will thus be seen that, by this arrangement, only the smooth outer margin of the film X is in contact with these shoulders, and consequently the film slides smoothly and evenly thereover, whereas formerly these shoulders as 30b were carried under the perforations X', with the result that as these perforations passed over the shoulder, the movement of the film is bound to be jerky and uneven, and this roughness and unevenness is bound to be reflected in the quality of the tone received from the sound apparatus.

A block 32 with a special form of drop-out mechanism therefor is shown in Figs. 5 and 6. This block is carried on a yoke 33 which is loosely mounted and guided on a supporting bracket 34, 35 which is hingedly mounted at 36 to a bracket 37 attached to the sleeve 30. While the yoke 33 is loosely guided in the supporting bracket 34, it is yieldably supported by means of a spring 38 which is carried by the bracket 34. The bracket 34, 35 is supported and locked in its operative position by means of a finger 39 carried by a shaft 40 which extends through the side of the case 10, and has an operating knob 41, as shown in Fig. 1.

Thus it will be seen that the block 32 can be raised and lowered at will by turning the knob 41. When lowered, the block 32 can readily be cleaned of dirt which is picked up and carried by the film, and which in passing thereover is likely to be deposited on the block as well as on the under surface of the sleeve 30. It will be observed that the block 32 is provided with lateral shoulders 32a, and that it is relieved throughout the central portion 32b in substantially the same way as that previously described for the groove 30a in the sleeve 30.

In Fig. 5 is shown an improved form of illuminating device for the light strip of the film which comprises telescoping tubes 43, 44, carrying suitable lenses 45 and 46, which are trained on the openings 32c, 30c of the block 32 and of the sleeve 30 respectively, light being supplied to these lenses by means of a suitable incandescent lamp 46.

At a suitable point in the tube 44 is mounted a diaphragm or partition 47 having a central opening 48 therein in which is mounted knife edges separated slightly so as to provide a very thin slit through which the light from the lamp 46 may be projected upon the light strip $X^2$ of the film X.

The new feature of this arrangement consists in the manner of mounting the filament 46a which lies horizontal and is parallel to the vertical slit between knives 48a, and which lies in the same vertical plane as this slit. Consequently, when any sagging of the filament 46a occurs, the filament does not pass out of the plane of the slit in which it is placed, but portions of this filament move slightly farther away from this slit.

Heretofore it has been customary to mount the tube 43, 44, or its equivalent, horizontally with the filament of the lamps supplying light thereto, also horizontally, with the result that when the filament of the lamp sagged, portions of the filament would pass out of the plane of the slit, with the result that a very imperfect lighting of the light strip of the film was brought about. That, however, is prevented by the present arrangement.

The amplifier circuits shown in Figs. 7 and 8 are sufficiently well known to those versed in this art that they need not be described in detail. The amplifier 42 may be any well known form of audio-frequency amplifier for electrical impulses of the general character herein contemplated, and this in turn is connected to any suitable form of loud speaker, not shown.

While I have shown and described but a few embodiments of my invention, it is to be understood that it is capable of many modifications. Changes, therefore, in the construction and arrangement may be made which do not depart from the spirit and scope of the invention as disclosed in the appended claims.

I claim:

1. In a motion picture projector and sound-on-film reproducer, a case, a source of light therein, a sound deadening mounting panel within said case and spaced therefrom, projecting mechanism mounted on said sound deadening panel, sound deadening spacing means between the case and panel, means for blowing air into said case at a point remote from the light source, means for blowing air out of said case from a point near the light source, and sound reproducing mechanism mounted on the panel.

2. In a combined motion picture projector and sound-on-film reproducer, a case, a sound deadening mounting panel within said case and spaced therefrom, sound deadening means between said panel and case, projecting mechanism mounted on said panel, and sound reproducing mechanism mounted on said panel.

3. In a combined motion picture projector and sound-on-film reproducer, a case, a sound deadening mounting panel within said case and spaced therefrom, sound deadening means between said panel and case, projecting mechanism mounted on said panel, a source of light for the projector, sound reproducing mechanism mounted on said panel, and means for causing a current of air to flow through said case while the projector mechanism is in operation, the outlet for air being adjacent the light source of the projector.

4. In a combined motion picture projector and sound-on-film reproducer, a case, a sound deadening mounting panel within said case and spaced therefrom, sound deadening means between said panel and case, projecting mechanism mounted on said panel, and sound reproducing mechanism mounted on said panel, the outlet for air being adjacent the light source of the projector.

5. In a combined motion picture projector and sound-on-film reproducer, a case, a sound deadening mounting panel within said case and spaced therefrom, sound deadening means between said panel and case, projecting mechanism mounted on said panel, sound reproducing mechanism mounted on said panel, and means for causing a current of air to flow through said case while the projector mechanism is in operation, the outlet for air being adjacent the light source of the projector.

6. In a combined motion picture projector and sound-on-film reproducer, a case, a sound deadening mounting panel within said case and spaced therefrom, rubber washers between said panel and case, projecting mechanism mounted on said panel, and sound reproducing mechanism mounted on said panel.

7. In a combined motion picture projector and sound-on-film reproducer, a case, a sound deadening mounting panel within said case and spaced therefrom, rubber washers between said panel and case, projecting mechanism mounted on said panel, sound reproducing mechanism mounted on said panel, and means for causing a current of air to flow through said case while the projector mechanism is in operation.

JOHN RIPLEY KIEL.